(12) United States Patent  
Meshke et al.

(10) Patent No.: US 6,641,219 B2
(45) Date of Patent: Nov. 4, 2003

(54) REDUCED COST HEAD RESTRAINT SUPPORT TUBE TO IMPROVE SYSTEM FUNCTION

(75) Inventors: Paul E. Meshke, Germantown, WI (US); Steven R. Koch, Richfield, WI (US); Alan Joseph Radue, Clinton Township, MI (US)

(73) Assignee: E.R. Wagner Manufacturing Company, Milwaukee, WI (US)

( * ) Notice: Subject to any disclaimer, the term of this patent is extended or adjusted under 35 U.S.C. 154(b) by 0 days.

(21) Appl. No.: 10/025,440

(22) Filed: Dec. 18, 2001

(65) Prior Publication Data

US 2003/0111889 A1 Jun. 19, 2003

(51) Int. Cl.$^7$ ................................................. A47C 1/10
(52) U.S. Cl. .................. 297/391; 297/463.1; 297/463.2
(58) Field of Search ................................ 297/391, 410, 297/463.1, 463.2; 403/364, 361, 329; 285/419, 373, 331, 148.23, 148.18

(56) References Cited

U.S. PATENT DOCUMENTS

| | | | | |
|---|---|---|---|---|
| 976,060 A | * | 11/1910 | Fulton | 92/47 |
| 2,695,038 A | * | 11/1954 | Parce et al. | 138/121 |
| 3,948,561 A | * | 4/1976 | de Rosa | 297/391 |
| 4,427,233 A | * | 1/1984 | Matumoto | 297/391 |
| 4,483,565 A | * | 11/1984 | Terui et al. | 297/410 |
| 4,607,866 A | * | 8/1986 | Erlichman | 285/45 |
| 4,615,543 A | * | 10/1986 | Cannon | 285/12 |
| 4,858,994 A | * | 8/1989 | Yamashita | 297/391 |
| 4,897,140 A | * | 1/1990 | Opsvik | 156/250 |
| 4,997,209 A | * | 3/1991 | McGrath et al. | 285/7 |
| 5,056,867 A | * | 10/1991 | Foster et al. | 297/410 |
| 5,556,170 A | * | 9/1996 | Lai et al. | 297/463.1 |
| 5,788,250 A | * | 8/1998 | Masters et al. | 297/410 |
| 5,984,567 A | * | 11/1999 | Gollin et al. | 403/371 |
| 5,992,939 A | * | 11/1999 | Gass et al. | 297/463.1 |
| 6,099,077 A | * | 8/2000 | Isaacson | 297/410 |
| 6,296,316 B1 | * | 10/2001 | Hann | 297/463.1 |
| 6,453,973 B1 | * | 9/2002 | Russo | 160/135 |

OTHER PUBLICATIONS

Wenthe–Davidson Website, www.wenthe–davidson.com, last updated Mar. 27, 2000.
E.R. Wagner, Drawing First supplied to customer on or about Jan. 10, 2000.
E.R. Wagner, Brochure titled "Tubular Motor Housings . . . A Better Choice! Bigger Savings!" Published prior to Dec., 2000.
E.R. Wagner, Brochure titled "Sleeves Spacers Bushings Tubes . . . What's So Unusual About The Usual? E.R. Wagner Quality!" Published prior to Dec., 2000.
E.R. Wagner, Brochure titled "Tubular Parts . . . Meeting Your Needs! Reducing Your Costs!" Published prior to Dec., 2000.
E.R. Wagner, Brochure titled "Custom Tubular Parts . . . Where Custom and Quality Come Together!" Published prior to Dec., 2000.

* cited by examiner

*Primary Examiner*—Peter M. Cuomo
*Assistant Examiner*—Stephanie Harris
(74) *Attorney, Agent, or Firm*—Michael Best & Friedrich LLP

(57) ABSTRACT

An improvement in an apparatus used to retain a plastic guide that guides the post of a vehicle head restraint during vertical adjustment. The improved head restraint support tube formed from a flat sheet having two interlocking sides. The sheet formed into a tubular body that retains a plastic guide. The plastic guide used to guide the head restraint post within the hollow tube. The tubular body further having a necked down region with a smaller inner diameter when compared to the remainder of the tube to improve its retaining capability. Additionally, the improved head restraint support tube has a series of lances located at one or both ends to further retain the plastic guide and reduce lateral movement.

8 Claims, 3 Drawing Sheets

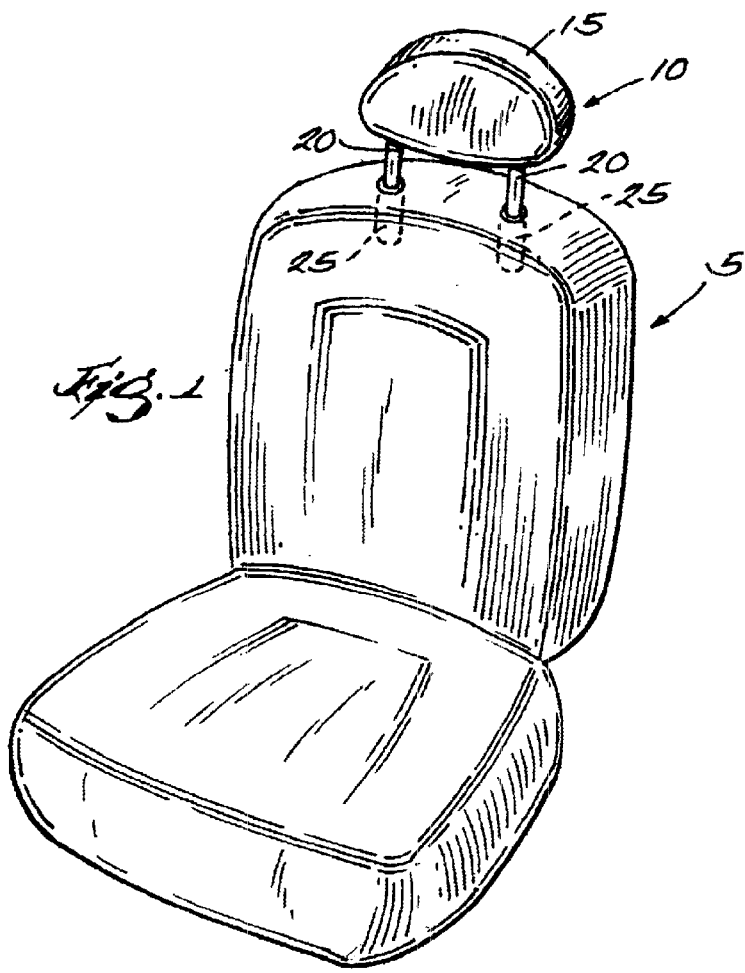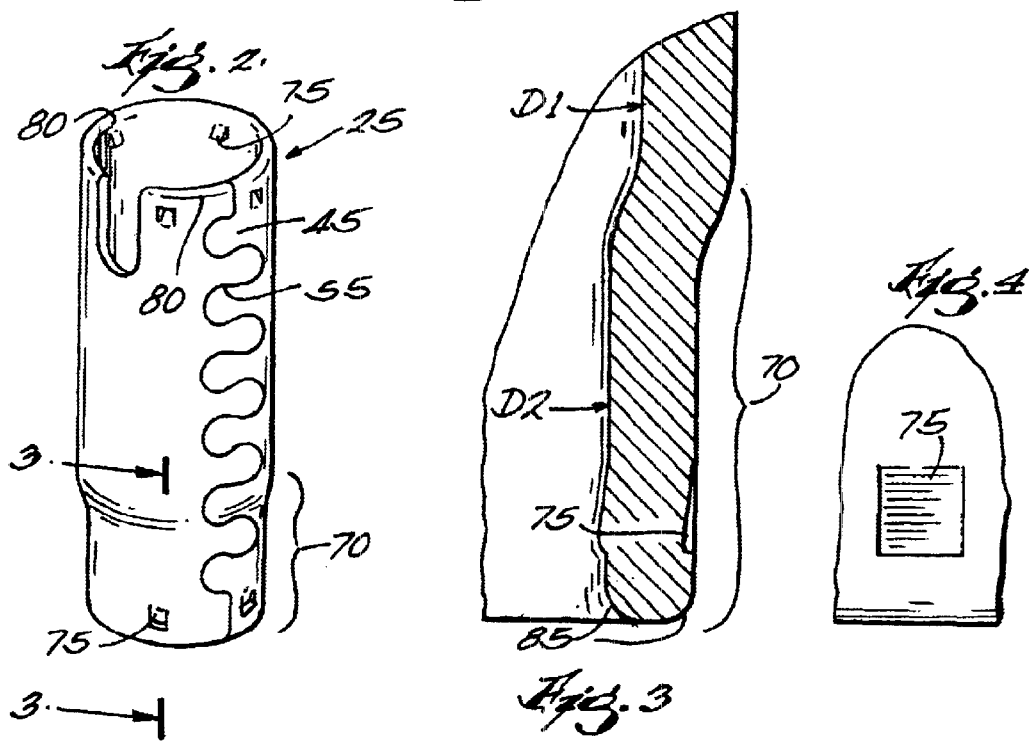

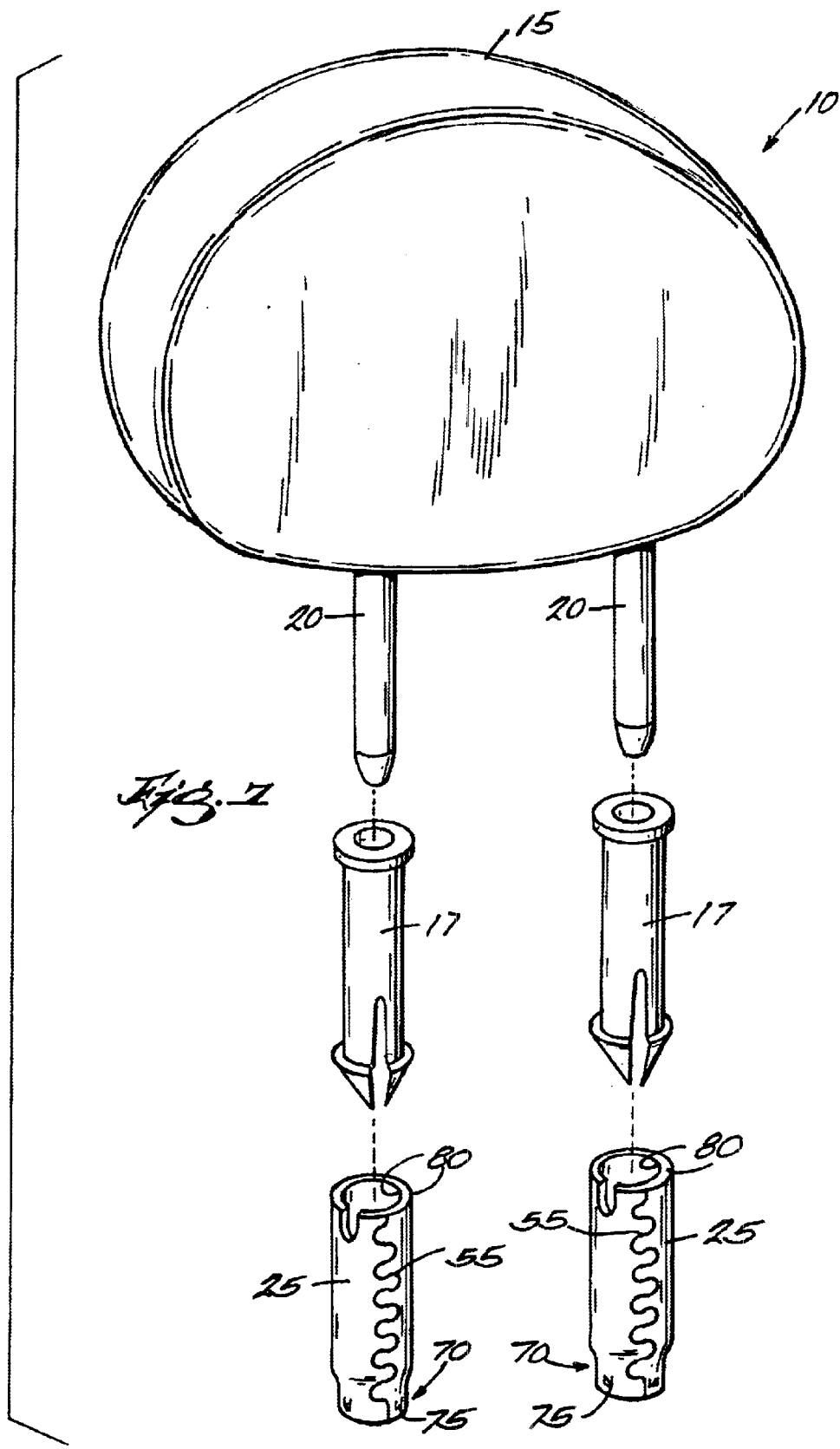

US 6,641,219 B2

REDUCED COST HEAD RESTRAINT SUPPORT TUBE TO IMPROVE SYSTEM FUNCTION

FIELD OF THE INVENTION

The invention relates generally to head restraint support tubes for allowing sliding motion between two components and more specifically to tubular guide members for use in guiding vehicle head restraints during vertical adjustment.

BACKGROUND OF THE INVENTION

Head restraint support tubes of the type described herein are typically used in vehicles as a structural member that allows the head restraint to be attached to the seat back. The head restraint typically has one or more vertical posts that allow the head restraint to move up or down while maintaining alignment and still being firmly held in the seat. This is accomplished via a plastic guide inserted into the head restraint support tube that guides the vertical posts.

In many previous head restraint support tubes, the head restraint support tube inside diameter is too large, allowing the plastic guides to rattle within the head restraint support tube during vehicle operation. Due to the proximity of the head restraint support tube to the driver's head, the rattling can be noticeable. It is therefore desirable to provide a tightly toleranced fit between the plastic guide and the head restraint support tube to prevent rattling. However, if the fit is too tight, assembly of the plastic guide will be difficult causing high effort to raise and lower the head restraint assembly. It is desirable that head restraint adjustment be simple and easy, encouraging users to properly adjust the head restraint to prevent potential injuries in a collision. A properly sized head restraint support tube will contain the plastic guide so as to restrain the vertical post sufficiently to prevent rattling while still allowing easy adjustment.

While inserting the plastic guide into the head restraint support tube, it is possible for the plastic guide to contact the inner circular edges of the head restraint support tube. In these situations, it is possible for the head restraint support tube to scratch or score the plastic guide during assembly. Therefore, in some applications it is important to reduce the likelihood of this type of damage when using head restraint support tubes of the type described herein.

SUMMARY OF THE INVENTION

The present invention provides for a tightly toleranced fit between the head restraint support tube and the vertical post by providing a tube having a portion with a reduced diameter to firmly restrain the plastic guide and vertical post to prevent rattling. To further reduce manufacturing costs, the invention uses a flat sheet having first and second sides shaped to allow for an interlocking arrangement. The sheet is formed into a tubular shape having a first and second end wherein the first and second sides interlock. The inside diameter of a portion of the tube adjacent to one end may be smaller than the remainder of the tube. In addition to reducing the diameter of a portion of the tube, the invention may reduce the potential for rattling by forming lances at either or both ends of the tube. The lances restrain the plastic guide without substantially increasing the force required to adjust the head restraint.

Another feature of the invention is the use of rounded or filleted ends to reduce the likelihood of damage to the plastic guide as it is assembled (inserted) into the head restraint support tube.

Other features and advantages of the invention will become apparent to those skilled in the art upon review of the following detailed description, claims, and drawings.

BRIEF DESCRIPTION OF THE DRAWINGS

FIG. 1 is a perspective view of an automobile seat employing the invention;

FIG. 2 is a perspective view of an embodiment of the present invention;

FIG. 3 is a section view of the tubular body showing the reduced diameter region of the tube;

FIG. 4 is an enlarged view of a lance;

FIG. 7 is an exploded view of a head restraint, plastic guides, and support tubes.

DETAILED DESCRIPTION OF THE PREFERRED EMBODIMENTS

Figure 5:
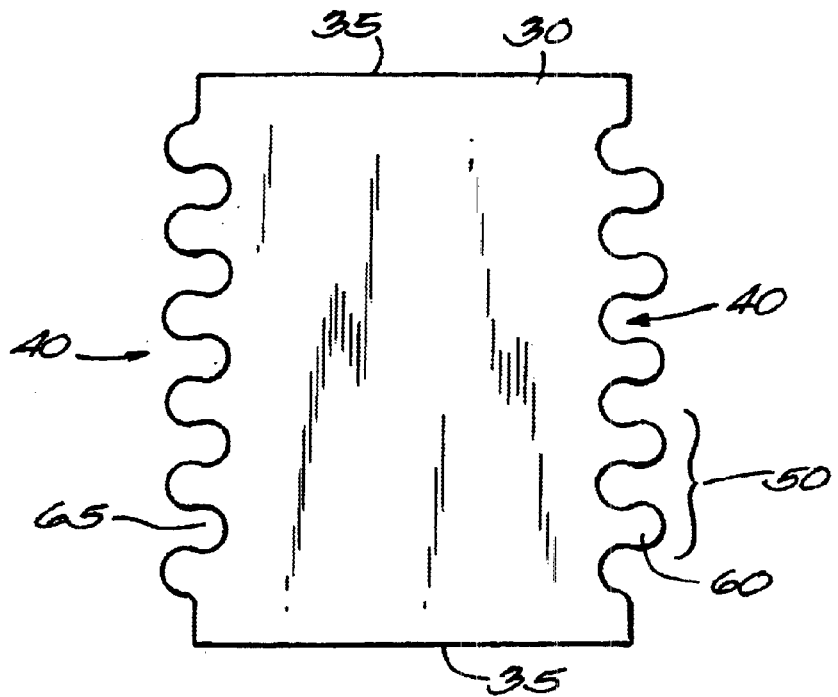
FIG. 5 is a flat sheet having edges prepared for forming the tubular body.

FIGS. 1 and 7 illustrate a typical automobile seat 5 that employs the invention. The typical seat 5 in an automobile or truck is manufactured for both comfort and safety. The seat 5 itself typically includes an adjustable head restraint 10 placed at the top of the seat 5. The head restraint 10, if properly used, prevents violent rearward movement of a driver, or passengers, head during a collision. To be effective in preventing this violent rearward movement, and consequently preventing or reducing neck injuries during collisions, proper positioning of the head restraint 10 behind the driver's head is required. If the head restraint 10 is positioned too low or too high for the specific passenger or driver it may be ineffective at preventing injury, or worse it may enhance the potential injury.

A typical adjustable head restraint 10, shown in FIGS. 1 and 7, consists of a padded rest 15 inserted into a plastic guide 17 containing a locking member (not shown) which locks the padded rest 15 at the desired elevation. Along with the padded rest 15, a typical head restraint 10 includes one or more vertical posts 20 that maintain the padded rests 15 desired alignment. Embedded and locked within the car seat 5 are head restraint support tubes 25 containing plastic guides 17 in which the vertical posts 20 slide during head restraint 10 adjustment. The head restraint support tube 25 and plastic guide 17 retain the head restraint 15 and maintain its orientation during vertical adjustment.

The head restraint support tube 25 of the present invention is manufactured from a flat piece of steel 30 having a uniform thickness. It is desirable that the material chosen be malleable so that it will not develop cracks or harden significantly during the forming process. The preferred material is low carbon steel, however, alloy steel, stainless steel, brass, bronze, or aluminum could be used with equal success. In fact, any formable material could be used to form the head restraint support tube 25 of the present invention, the actual material is not significant to the invention. Further, the present invention uses a piece of material having a uniform thickness. A piece of material having a non-uniform thickness could also be used to form the head restraint support tube 25 if desired.

FIG. 5 shows a flat piece of material 30 before its formation into a tube. The flat sheet 30 is sheared to the desired rectangular size having two short sides 35 and two long sides 40. Tubes having a circumference equal to their height require a square shaped piece of material having short sides 35 and long sides 40 of equal length. The short side 35 length is determined by calculating the desired circumference of the finished head restraint support tube 25. The short side 35 length would then be the finished tube circumference adjusted for any distortion that may occur during the manufacturing process. The long side 40 length is determined based on the desired length of the finished head restraint support tube 25. Again, the actual long side 40 length would be adjusted to account for any distortion or stretching that may occur during the manufacturing processes to assure that the finished tube is the desired length. It is desirable to form the head restraint support tube 25 to its final length rather than cut it to length for several reasons. First, the cutting operation produces waste, which in a mass production process will eventually be quite costly. Second, the cutting operation requires additional labor and time to perform. Finally, the cutting operation creates sharp edges that could cause harm to the plastic guides 17 sliding within the head restraint support tube 25. The sharp edges also make safe handling of the head restraint support tubes 25 more difficult. Therefore, additional steps are required to finish the sharp edges, and verify that they are indeed acceptable. Using sheet material sized to give the proper head restraint support tube length eliminates these steps. The sheet material 30 is typically supplied with rounded or filleted edges thus eliminating the steps of smoothing or finishing sharp edges.

Figure 6:
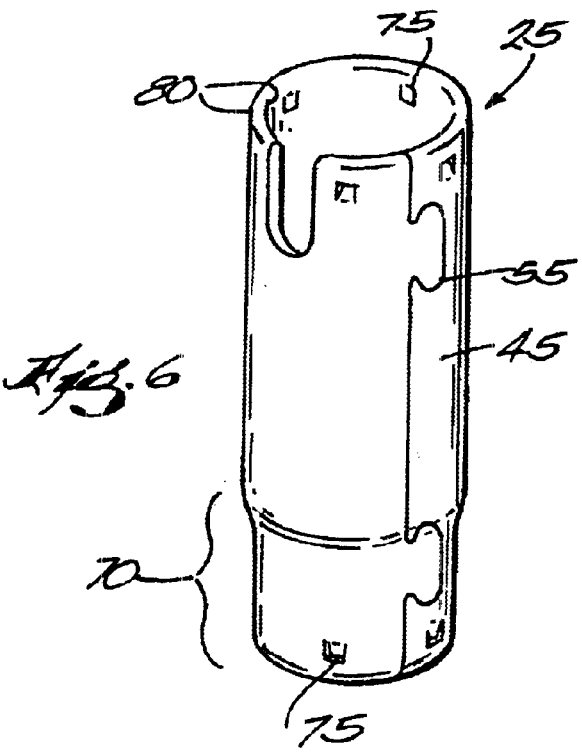
FIG. 6 is a perspective view of a second embodiment of the present invention.

Before forming the tubular body 45, the long edges 40 are sheared into an interlocking pattern 50. FIG. 5 illustrates a typical pattern 50 sheared into the long edges, before forming the tubular body 45. FIG. 6 shows another possible interlocking pattern 50 in a completed head restraint support tube 25. Many patterns are possible and are contemplated by the present invention. For example, a saw tooth pattern would work as well as the illustrated patterns. Further, a square wave pattern or even a sinusoidal wave pattern would allow the two sides to interlock during the forming operation. Many commonly known manufacturing means are available to form the desired pattern. For example, the pattern can be made using a contoured shear, or the pattern could be made using wire EDM, water jet cutting, or plasma cutting and the like.

Once the interlocking pattern 50 is formed into the desired edges, the flat sheet 30 can be formed into a tubular body 45. In the preferred embodiment, the flat sheet 30 is formed into a tubular body 45 using a stamping and forming process. In this process, the flat sheet 30 is first stamped into a "U" shape. The "U" shaped piece is then fed over a mandrel where additional tooling is used to gradually form the completed tubular body 45. Using this process, the interlocking patterns 50 engage one another in sequence, zipping the seam 55 closed. In other words, as the flat sheet 30 is fed through the tooling, the initial or first interlocking members 60 engage one another. As the sheet 30 is further fed through the tooling, each subsequent interlocking member 60 engages its counterpart 65 in sequence thus achieving a closed interlocked seam 55. While stamping and forming as just described is the preferred manufacturing process, rolling of the flat sheet 30 will also produce tubes of the desired diameter. When using a rolling process, the tubular members' diameter is gradually reduced until the interlocking patterns 50 engage one another. At this point, the tubular body 45 should be at the desired final diameter. While two manufacturing methods have been described, other known processes such as stamping, drawing or coining may also be used individually or in combination with those described to form the desired tubular body 45.

While constant diameter tubes provide sufficient restraint in many applications, other applications may require an increase in the restraint on the plastic guide 17 to reduce the likelihood of rattling. To achieve this increased restraint, a portion of the tubular body 45 can be necked down. The necked down portion 70 has a slightly smaller inside diameter $D2$, compared to the remaining tube diameter $D1$, allowing it to more tightly restrain the plastic guide 17. FIGS. 2 and 6 illustrate finished head restraint support tubes 25 having a necked down portion 70. To form the necked down portion 70, many known processes are available. For example, the necked down portion 70 could be stamped to achieve a smaller diameter. In addition, a rolling process or a forming process could be used. A forming process could be used in conjunction with the tubular body forming process described above to form the necked down portion 70 at the same time the tubular body 45 is formed. In another embodiment, the flat sheet 30 is not uniform in thickness but rather has a thicker portion. When the sheet 30 is formed into a tubular body 45, the thicker portion is located on the inside of the forming tube. The thicker portion produces an end having a slightly reduced diameter on the inside and a relatively constant diameter on the outside. Any of these methods or any combination of them would be successful in forming the necked down portion 70 of the tubular body 45.

While the necked down portion 70 reduces the likelihood of rattling of the vertical post 20 within the plastic guide 17 and head restraint support tube 25, it may not eliminate all rattling or lateral movement. If the necked down portion 70 did retain the plastic guide 17 eliminating all lateral movement, it would likely be too tight. If the head restraint support tube 25 is too tight, movement of the vertical post 20 within the plastic guide 17 and head restraint support tube 25 becomes difficult due to increased friction. This in turn makes it more difficult to position the head restraint 10 for the particular passenger or driver. To improve the retaining capability of the head restraint support tube 25 without substantially increasing the friction on the vertical post 20, a plurality of lances 75 can be placed at one or both ends of the tubular body 45. While the preferred embodiment uses lances 75 at both ends of the tubular body 45, it is contemplated that lances 75 at one end alone would improve the retaining capability of the head restraint support tube 25 and is thus within the contemplated invention. In addition, in some applications the use of lances 75 is unnecessary. As shown in FIGS. 3 and 4, lances 75 are small indentations placed near the end of the tubular body 45. The process of placing an indentation on the outside diameter of the tube produces a corresponding inner protrusion. FIG. 3 shows a section view taken through a lance of a finished head restraint support tube 25 having a necked down portion. The total surface area of the protrusion that contacts the plastic guide 17 is small, thus minimizing the friction on the vertical post 20 during head restraint 10 adjustment. FIG. 4 shows a square shaped lance on the outer surface of the tube. While FIG. 4 shows a square shape, any shaped indentation that produces a corresponding projection on the inner surface will perform the function of a lance. Several lances 75 placed around the tubular body 45 reduce the diameter through which the plastic guide 17 is free to pass. This reduces the possible amount of lateral movement of the post 20 within the plastic guide 17. Reduction of the inner diameter of the head restraint support tube 25, which holds the plastic guide 17 through which the posts travel, reduces rattling while still allowing free movement of the vertical post 20.

The lances 75 of FIGS. 3 and 4 are made in the tubular body 45 using one or more known methods. For example, a coining operation could be used. In a coining operation, a pattern is stamped into the piece either before forming the tubular body 45 or after. In another process, a forging operation is used. No matter the method used to place the lances 75 in the tubular body 45, care must be exercised to maintain the round shape of the tubular body 45. For example, in a process in which the lances 75 are formed after the tubular body 45, the inner diameter of the tubular body 45 must be supported while the lances 75 are placed on the outer diameter. The support minimizes the potential distortion of the head restraint support tube 25. In a preferred process, lances 75 as well as any other desired features (e.g., holes, notches, and fillets) are applied to the flat sheet 30 before it is formed into a tubular body 45. This process has two significant advantages. First, distortion caused by the application of the desired feature becomes insignificant since the tubular body 45 has not yet been formed. Second, forming these features on the flat sheet 30 before forming the tubular body 45 eliminates the need for costly additional manufacturing operations to incorporate the desired features.

While the lances 75 reduce the likelihood of contact between the head restraint support tube circular edges 80 and the plastic guide 17, this contact is still possible. Therefore, it is important that these edges 80 be smooth, rounded, or filleted as shown in FIG. 3. As has been described, these surfaces are typically rounded on the flat sheet material 30 before forming the tubular body 45. However, if alternative manufacturing processes or materials are used it may be necessary to smooth these surfaces. Typically, a grinding or finishing operation would be used. However, machining or even hand working, such as sanding or deburring, can be used as necessary. In the preferred embodiment, no additional steps are required to achieve the rounded feature 85 of the head restraint support tube 25.

Although particular embodiments of the present invention have been shown and described, other alternative embodiments will be apparent to those skilled in the art and are within the intended scope of the present invention. Thus, the present invention is to be limited only by the following claims.

What is claimed is:

1. An apparatus for retaining a guide that supports and guides a vertical post of a vehicle head restraint, the apparatus comprising:

a tubular body, formed from a flat metal sheet having a first side and a second side, the flat metal sheet being then shaped to form a generally hollow cylindrical configuration with the hollow cylindrical configuration having a longitudinal axis and a seam extending in the direction of the longitudinal axis and interlocking the first and second sides, the tubular body also having a first end having a first inner diameter, and a second end, the second end having a necked down portion having a second inner diameter smaller than the first inner diameter.

2. The apparatus of claim 1, wherein the tubular body first and second ends are rounded to prevent scoring the guide.

3. The apparatus of claim 1, further comprising at least one lance formed in one of the tubular body first and second ends to reduce lateral movement of the guide.

4. The apparatus of claim 1, further comprising at least one lance formed in each of the tubular body first and second ends to reduce lateral movement of the guide.

5. An apparatus for supporting a vehicle head restraint having a vertical post, the apparatus comprising:

a plastic guide for supporting and guiding the vertical post of the vehicle head restraint, a tubular body for retaining and housing the plastic guide, the tubular body being formed from a flat metal sheet having a first side and a second side, the flat metal sheet being then shaped to form a generally hollow cylindrical configuration with the hollow cylindrical configuration having a longitudinal axis and a seam extending in the direction of the longitudinal axis and interlocking the first and second sides, the tubular body also having a first end having a first inner diameter, and a second end, the second end having a necked down portion having a second inner diameter smaller than the first inner diameter.

6. The apparatus of claim 5, wherein the tubular body first and second ends are rounded to prevent scoring the plastic guide.

7. The apparatus of claim 5, further comprising at least one lance formed in one of the tubular body first and second ends to reduce lateral movement of the plastic guide.

8. The apparatus of claim 5, further comprising at least one lance formed in each of the tubular body first and second ends to reduce lateral movement of the plastic guide.

* * * * *